United States Patent
Mayuzumi (10) Patent No.: US 10,157,470 B2
(45) Date of Patent: Dec. 18, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Ichiko Mayuzumi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 42 days.

(21) Appl. No.: 15/599,328

(22) Filed: May 18, 2017

(65) Prior Publication Data
US 2017/0345160 A1 Nov. 30, 2017

(30) Foreign Application Priority Data
May 27, 2016 (JP) ................... 2016-106236

(51) Int. Cl.
| | |
|---|---|
| G06K 9/00 | (2006.01) |
| G06T 7/207 | (2017.01) |
| G06T 7/292 | (2017.01) |
| G06T 7/00 | (2017.01) |
| H04N 7/18 | (2006.01) |
| G08B 13/196 | (2006.01) |

(52) U.S. Cl.
CPC .......... G06T 7/207 (2017.01); G06K 9/00228 (2013.01); G06K 9/00288 (2013.01); G06K 9/00362 (2013.01); G06K 9/00778 (2013.01); G06T 7/292 (2017.01); G06T 7/97 (2017.01); G08B 13/19602 (2013.01); G08B 13/19656 (2013.01); H04N 7/18 (2013.01); H04N 7/181 (2013.01); *G06T 2207/10016* (2013.01); *G06T 2207/20016* (2013.01); *G06T 2207/20212* (2013.01); *G06T 2207/30196* (2013.01); *G06T 2207/30201* (2013.01); *G06T 2207/30232* (2013.01)

(58) Field of Classification Search
CPC .......... G06T 7/207; G06T 2207/30201; G06T 2207/30196; G06T 2207/20212; G06T 2207/20016; G06T 7/97; G06T 7/292; G06T 2207/10016; G08B 13/19656; G08B 13/19602; H04N 7/181; H04N 7/18; G06K 9/00778; G06K 9/00362; G06K 9/00288; G06K 9/00228
USPC ....................................................... 382/103
See application file for complete search history.

(56) References Cited

U.S. PATENT DOCUMENTS

| | | | |
|---|---|---|---|
| 6,215,519 B1 * | 4/2001 | Nayar | ............... G08B 13/19608 348/148 |
| 9,230,250 B1 | 1/2016 | Parker et al. | |
| 2002/0149693 A1 | 10/2002 | Tantalo et al. | |

FOREIGN PATENT DOCUMENTS

| | | | | |
|---|---|---|---|---|
| GB | 2379354 A | | 3/2003 | |
| JP | 2002101410 A | * | 9/2000 | ............... H04N 7/18 |
| JP | 2003-264790 A | | 9/2003 | |
| JP | WO 2015104953 A1 | * | 7/2015 | ....... G08B 13/19682 |

(Continued)

*Primary Examiner* — Gregory F Cunningham
(74) *Attorney, Agent, or Firm* — Canon USA, Inc. I.P. Division (57) ABSTRACT

To achieve highly accurate image analysis processing without using a large amount of network bandwidth, an analysis apparatus acquires an image via a network, executes analysis processing, acquires additional image data depending on a result of the analysis processing, and executes reanalysis processing by using the additional image data.

14 Claims, 7 Drawing Sheets

(56) References Cited

FOREIGN PATENT DOCUMENTS

WO    2015/104953 A1    7/2015

* cited by examiner

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

In a monitoring system installed in a store or a public institution, a plurality of cameras is installed at a plurality of locations, and transmits a captured image to a recording apparatus and an analysis apparatus installed in a back room or a monitoring room through a network. The recording apparatus stores an image (video), captured at a set frame rate for a predetermined period of time, acquired from the camera. The analysis apparatus executes image analysis processing based on an image acquired from the camera or stored in the recording apparatus. The image analysis processing includes moving object detection processing, moving object tracking processing, human body detection processing, face detection processing, face recognition processing, face authentication processing, passage detection processing, intrusion detection processing, congestion detection processing, and the like.

Japanese Patent Application Laid-Open No. 2003-264790 discusses a configuration in which a recording apparatus, which receives an image transmitted from a plurality of cameras, requests the camera to retransmit an image, failed to be received due to frame loss as a result of a communication error, to acquire the image.

In the monitoring system described above, a plurality of cameras is connected to each other on a network. The cameras each transmit a low resolution or a low frame rate image so that a large amount of network bandwidth is not used. Thus, the accuracy of the image analysis processing can be improved only to a limited level, even when the image can be acquired with no frame loss.

SUMMARY OF THE INVENTION

The present invention is directed to achieving highly accurate image analysis processing without using a large amount of network bandwidth. According to an aspect of the present invention, an image processing apparatus includes an acquisition unit configured to acquire image data of an image captured by an image capturing apparatus, via a network, and an analysis unit configured to execute analysis processing based on the image data acquired by the acquisition unit, wherein the acquisition unit is configured to acquire, via the network, as additional image data, image data of an image captured by the image capturing apparatus that is different from the image data having been used for the analysis processing, depending on a result of the analysis processing executed by the analysis unit, and wherein the analysis unit is configured to execute reanalysis processing by using the additional image data.

Further features of the present invention will become apparent from the following description of exemplary embodiments with reference to the attached drawings.

DESCRIPTION OF THE EMBODIMENTS

An exemplary embodiment of the present invention is described in detail below with reference to the drawings.

The exemplary embodiment described below is an example of how the present invention is implemented, and should be modified and changed as appropriate in accordance with a configuration and various conditions of an apparatus employing the present invention, which means that the present invention is not limited to the exemplary embodiment described below.

Figure 1:
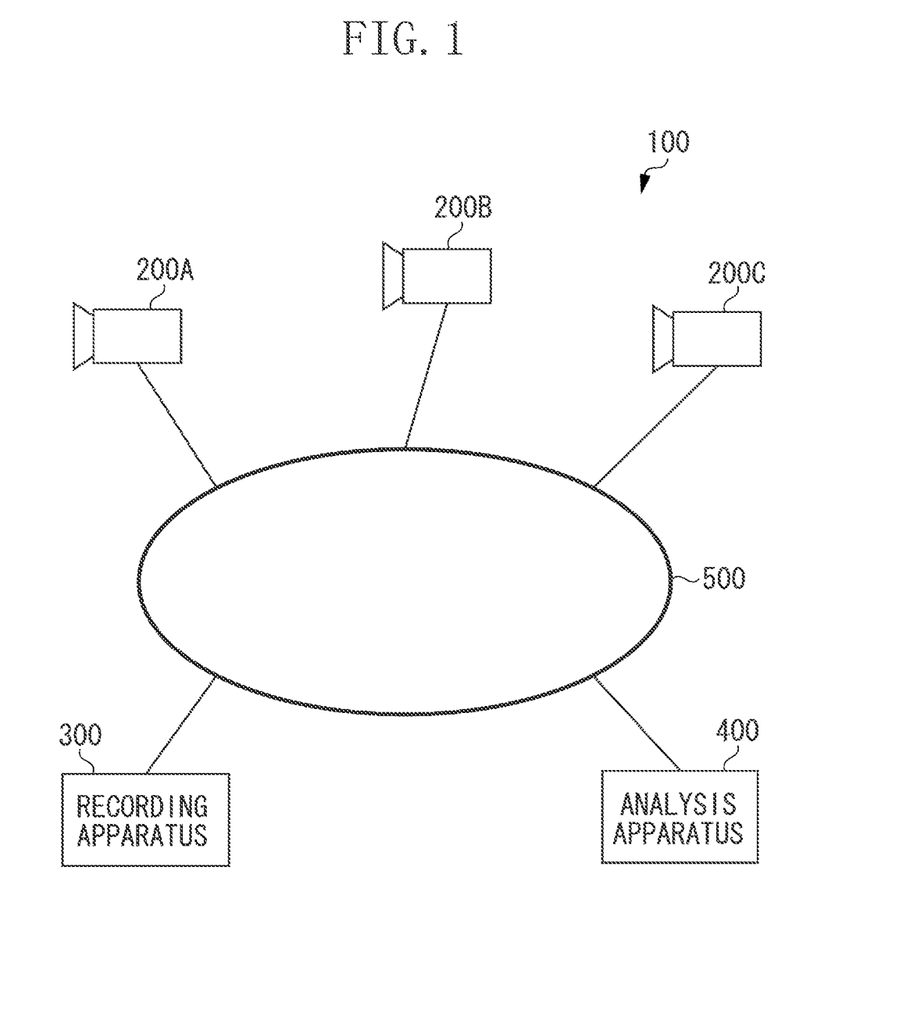
FIG. 1 is a network connection configuration diagram illustrating an example of an image processing system.

FIG. 1 is a network connection configuration diagram illustrating an example of an operation environment of an image processing system according to the present exemplary embodiment. In the present exemplary embodiment, the image processing system is applied to a network camera system.

A network camera system 100 includes a plurality of network cameras (hereinafter, simply referred to as "cameras" as appropriate) 200A to 200C, a recording apparatus 300, and an analysis apparatus 400. The cameras 200A to 200C, the recording apparatus 300, and the analysis apparatus 400 are connected to each other through a network 500. For example, the network 500 is a local area network (LAN).

The network 500 is not limited to the LAN, and may be the Internet, a wide area network (WAN), or the like. Physical connection to the network 500 includes wired connection and wireless connection. In FIG. 1, the three cameras 200A to 200C are connected to the network 500. However, the number of connected cameras is not limited to that in FIG. 1, as long as at least one camera is connected.

The cameras 200A to 200C are each an image capturing apparatus such as a monitoring camera that captures an image with a predetermined angle of view. The cameras 200A to 200C can each send (transmit) a captured image onto the network 500. The recording apparatus 300 records the image transmitted onto the network 500 by the cameras 200A to 200C.

For example, the cameras 200A to 200C according to the present exemplary embodiment store therein an image captured at 30 fps. The image is converted to have a frame rate of 10 fps to be transmitted onto the network 500. This is because, when each of the plurality of cameras 200A to 200C transmits a 30-fps image onto the network 500, a large amount of network bandwidth might be used, recording by the recording apparatus 300 might be unmaintainable, or a recording capacity might be insufficient.

The recording apparatus 300 acquires an image from the cameras 200A to 200C through the network 500. More specifically, the recording apparatus 300 stores the 10-fps image, to be transmitted onto the network 500 from the cameras 200A to 200C, in an internal hard disk or the like for a predetermined period of time or by an amount corresponding to the recording capacity.

For example, the analysis apparatus 400 includes an information processing apparatus such as a personal computer (PC) and can be operated by a user (a monitoring person for example). The analysis apparatus 400 acquires the 10-fps image, stored in the recording apparatus 300, and executes image analysis processing. The image analysis processing may include at least one of moving object detection processing, moving object tracking processing, human body detection processing, face detection processing, face recognition processing, face authentication processing, passage detection processing, intrusion detection processing, and congestion detection processing. In a case described in the present exemplary embodiment, the analysis apparatus 400 executes the moving object detection processing of detecting a moving object in an image and moving object tracking processing of tracking a moving object in an image, as the image analysis processing. The analysis apparatus 400 may have a display control function of displaying an image transmitted from the cameras 200A to 200C and a result of the image analysis processing, on a display unit. The analysis apparatus 400 may further have an input function of enabling the user to perform an operation for setting various parameters related to the image analysis processing. The analysis apparatus 400 and the recording apparatus 300 may be the same apparatus or may be different apparatuses.

Figure 2:
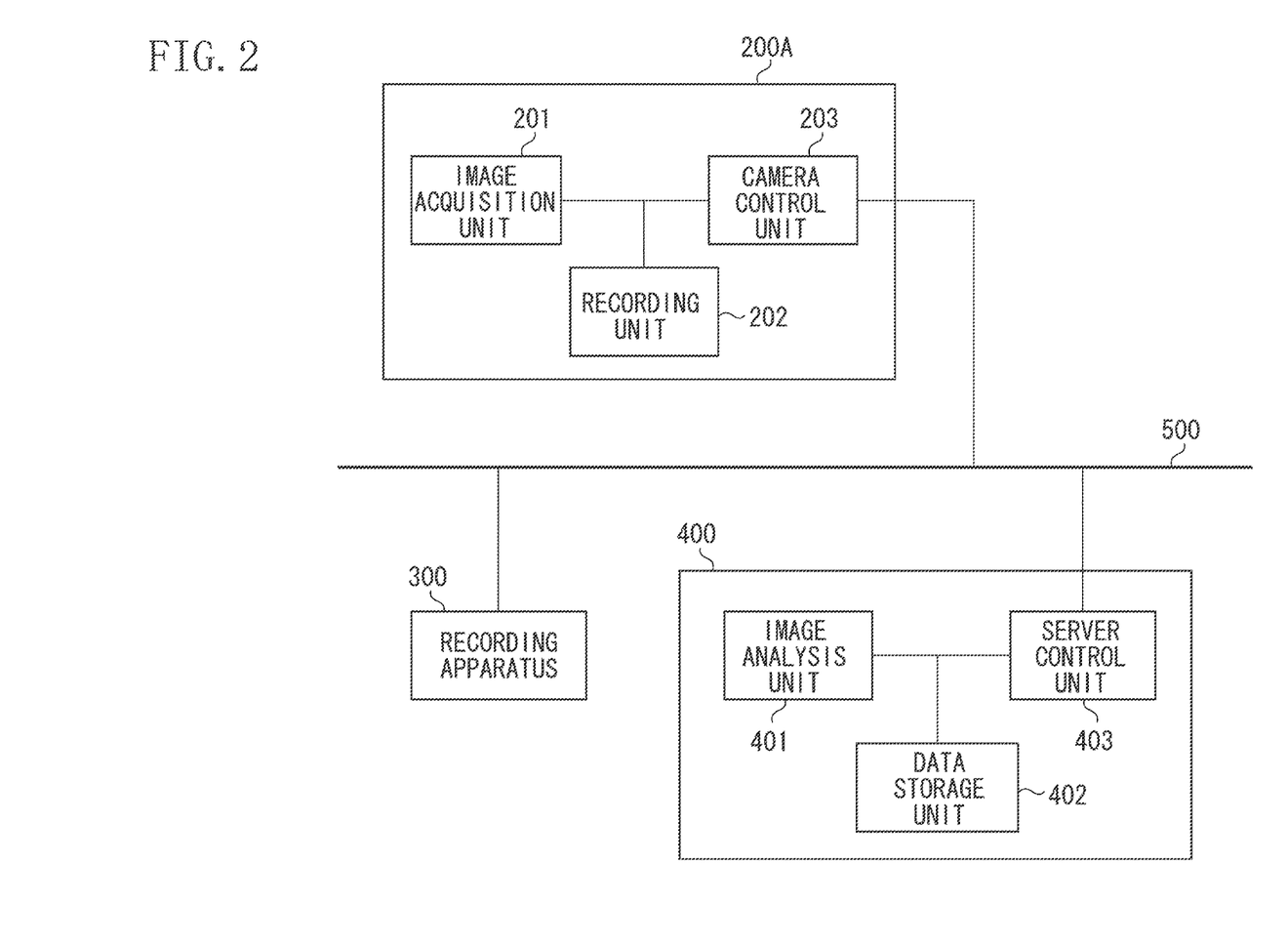
FIG. 2 is a functional block diagram illustrating a camera and an analysis apparatus.

FIG. 2 is a functional block diagram illustrating the camera 200A and the analysis apparatus 400. The cameras 200A to 200C have the same configuration and thus only the camera 200A is illustrated in FIG. 2.

The camera 200A includes an image acquisition unit 201, a recording unit 202, and a camera control unit 203. The image acquisition unit 201 sequentially acquires images from an image capturing unit (not illustrated), including a lens and a sensor, at a predetermined interval. The images are acquired at a frame rate set by the camera control unit 203. In the present exemplary embodiment, the frame rate of the image acquisition is 30 fps for example.

The recording unit 202 implements an Edge Storage function of storing an image, output from the image acquisition unit 101, in a storage medium, such as a secure digital (SD) card, in the camera for a predetermined period of time. When a requested image is designated from the camera control unit 203, the recording unit 202 reads a corresponding image in stored images, and outputs the image to the camera control unit 203.

The camera control unit 203 sets a parameter of the camera, such as the frame rate of image acquisition, for the image acquisition unit 201. The camera control unit 203 further sets a parameter related to image storing, such as an image storing period, for the recording unit 202. Further, when the camera control unit 203 receives an image transmission request described below from the analysis apparatus 400, which is an external apparatus, the camera control unit 203 designates a requested image corresponding to the image distribution request, for the recording unit 202.

The camera control unit 203 performs control in such a manner that the image acquired from the image acquisition unit 201 is converted to have a frame rate for network transmission, and then is transmitted onto the network 500. For example, in the present exemplary embodiment, the frame rate for the network transmission is 10 fps. More specifically, the camera control unit 203 performs control in such a manner that the image acquired from the image acquisition unit 201 is converted into an image with lower quality than that of the original image, and then the resultant image data is transmitted onto the network 500. Further, the camera control unit 203 can receive various requests from an external apparatus and perform control of performing a predetermined operation.

The analysis apparatus 400 includes an image analysis unit 401, a data storage unit 402, and a server control unit 403. The analysis apparatus 400 according to the present exemplary embodiment operates as an image processing apparatus. The image analysis unit 401 executes the image analysis processing on input images. The input images are images stored in the recording apparatus 300 or images directly transmitted from the cameras 200A to 200C. The image analysis processing may be the moving object detection processing and the moving object tracking processing as described above, and may be applied to processing of tracking a certain object.

The data storage unit 402 includes a storage medium that stores a result (analysis data) of the image analysis processing executed by the image analysis unit 401. The analysis data includes coordinates of a moving object detection portion in an image in the moving object detection processing and includes information and the position of a subject, track information, and ID information in the tracking processing. Thus, the type of the analysis data differs between the types of image analysis processing. The analysis data can be associated with an image with a frame number or the like.

The server control unit 403 executes the image analysis processing, parameter settings, and input image supply for the image analysis unit 401. The server control unit 403 performs control of writing and reading data to and from the data storage unit 402 and of outputting data to an external apparatus.

Further, when the server control unit 403 determines that the image analysis processing is executed by the image analysis unit 401 with insufficient information, the server control unit 403 requests the cameras 200A to 200C for an additional image frame as additional image data to achieve the image analysis processing with a higher accuracy. The additional image data is image data of an image among the images captured by the cameras 200A to 200C and is different from the image data already used for the image analysis processing. For example, the server control unit 403 determines that the image analysis processing is executed with insufficient information when the image analysis processing executed by the image analysis unit 401 fails or is executed with an accuracy lower than a target accuracy.

When the image analysis processing is the moving object detection processing and the moving object tracking processing, the server control unit 403 requests transmission of a high frame rate image corresponding to an interval where information for the image analysis processing is insufficient, as the additional image data for improving the accuracy of the image analysis processing. More specifically, the server control unit 403 requests the cameras 200A to 200C to transmit the 30-fps image stored therein. The server control unit 403 receives the image transmitted by the cameras 200A to 200C in response to the transmitted request, and outputs the image to the image analysis unit 401. Then, the image analysis unit 401 executes the image analysis processing again based on the input image.

Figure 3:
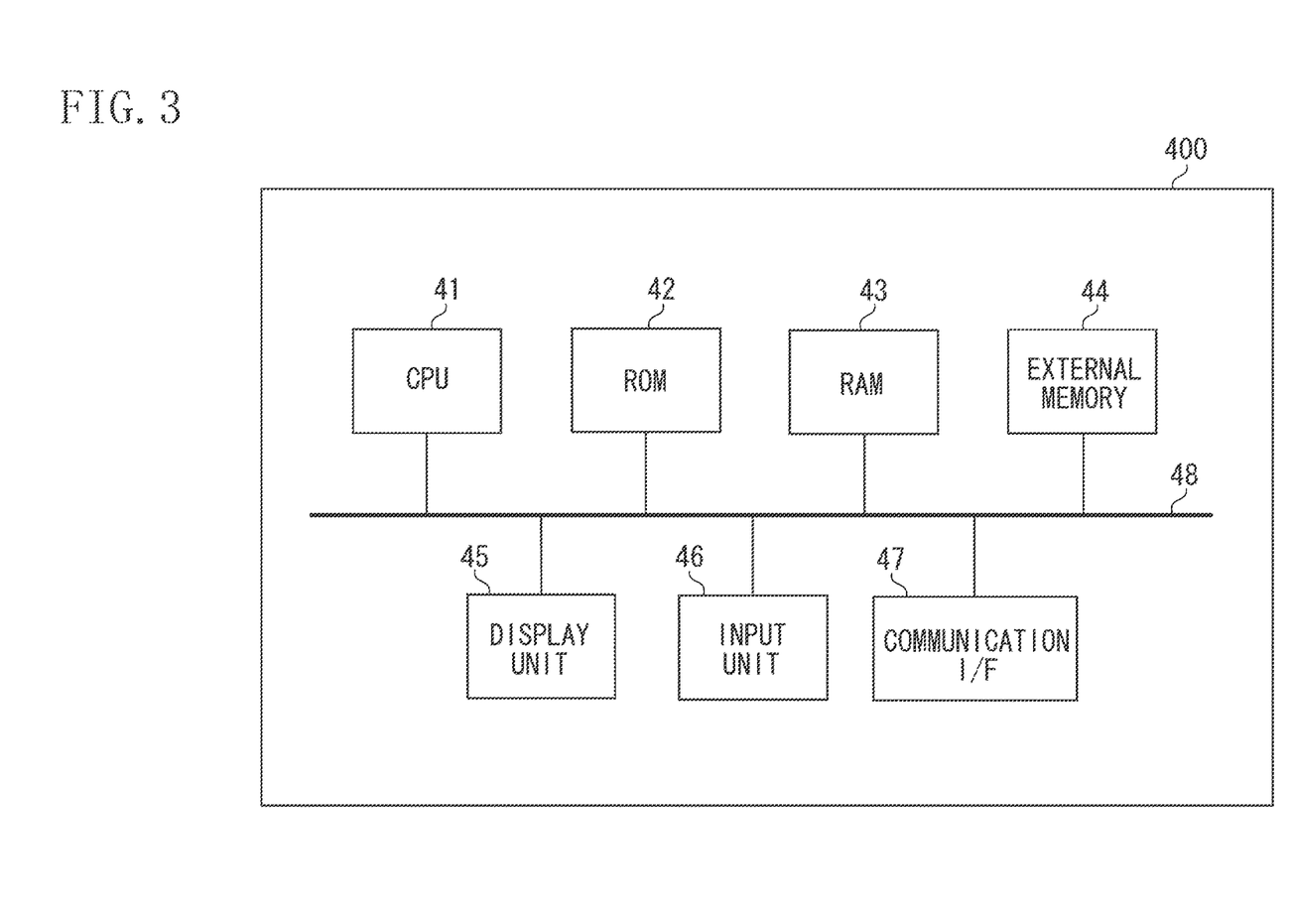
FIG. 3 is a diagram illustrating an example of a hardware configuration of the analysis apparatus.

FIG. 3 is a diagram illustrating a hardware configuration of the analysis apparatus 400.

The analysis apparatus 400 includes a central processing unit (CPU) 41, a read only memory (ROM) 42, a random access memory (RAM) 43, an external memory 44, a display unit 45, an input unit 46, a communication interface (I/F) 47, and a system bus 48.

The CPU 41 performs overall control on operations performed in the analysis apparatus 400, and controls the components (42 to 47) via the system bus 48. The ROM 42 is a nonvolatile memory that stores a program required for the CPU 41 to execute processing. The program may be stored in the external memory 44 or in a removable storage medium (not illustrated). The RAM 43 functions as a main memory and a work area for the CPU 41. More specifically, the CPU 41 executes processing by loading the required program onto the RAM 43 from the ROM 42 and executing the loaded program so that various functional operations are implemented.

The external memory 44 stores various types of data and various types of information required for the CPU 41 to execute the processing by using the program. The external memory 44 stores various types of data and various types of information obtained when the CPU 41 executes the processing by using the program. The display unit 45 includes a monitor such as a liquid crystal display (LCD). The input unit 46 includes a keyboard and a pointing device such as a mouse.

The communication I/F 47 is an interface for communicating with an external apparatus (the cameras 200A to 200C and the recording apparatus 300 in the present exemplary embodiment). For example, the communication I/F is a LAN interface. The system bus 48 establishes communicable connection among the CPU 41, the ROM 42, the RAM 43, the external memory 44, the display unit 45, the input unit 46, and the communication I/F 47.

The functions of the components of the analysis apparatus 400 illustrated in FIG. 2 can be implemented with a program executed by the CPU 41. At least part of the components of the analysis apparatus 400 illustrated in FIG. 2 may operate as dedicated hardware. In such a case, the dedicated hardware operates based on the control performed by the CPU 41.

The cameras 200A to 200C each include the image capturing unit as a hardware configuration in addition to the configuration illustrated in FIG. 3. The image capturing unit is a configuration for capturing an image of a subject, and includes an image sensor such as a complementary metal oxide semiconductor (CMOS) sensor or a charge coupled device (CCD) sensor. The cameras 200A to 200C may include a power button and various setting buttons as input units, instead of the keyboard and the like.

The functions of the components of the camera 200A illustrated in FIG. 2 can be implemented with a program executed by the CPU 41 of the camera 200A. At least part of the components of the camera 200A illustrated in FIG. 2 may operate as dedicated hardware. In such a case, the dedicated hardware operates based on the control performed by the CPU of the camera 200A.

Figure 4A:
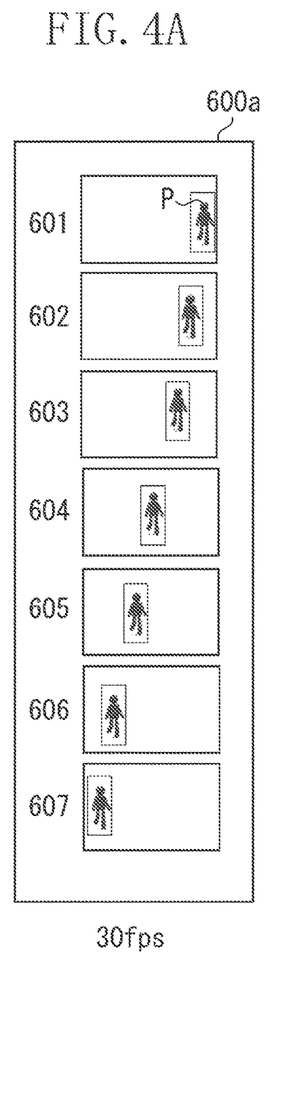
FIGS. 4A, 4B, and 4C are each a diagram illustrating image analysis processing executed by the analysis apparatus.
Figure 4B:
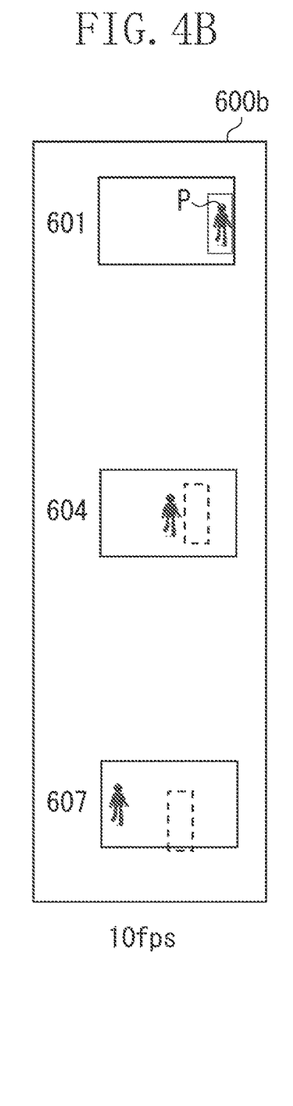
Figure 4C:
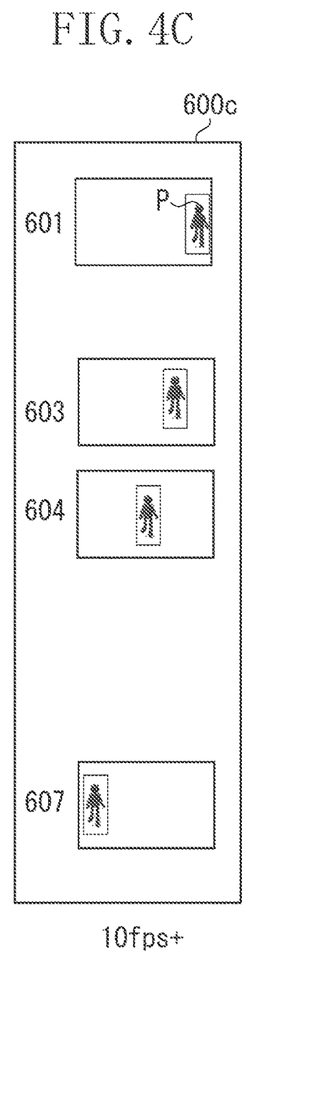

FIGS. 4A, 4B, and 4C are each a diagram illustrating the image analysis processing executed by the analysis apparatus 400. FIG. 4A illustrates a sequence of the 30-fps image stored in the camera, and FIG. 4B illustrates an example of partial intervals in a sequence of the 10-fps image received by the analysis apparatus 400.

FIG. 4A illustrates an image sequence 600a including images corresponding to a first frame 601 to a seventh frame 607 captured at 30 fps. The image sequence 600a is obtained with a high frame rate and thus involves a small amount of movement of a person P, who is the subject, within the image from one frame to the subsequent frame (for example, from a frame 602 to a frame 603). On the other hand, an image sequence 600b illustrated in FIG. 4B is obtained with a reduced frame rate and thus involves a large amount of movement of the person P within the image from one frame to the subsequent frame (for example, from a frame 604 to the frame 607).

In each of the image sequence 600a illustrated in FIG. 4A and the image sequence 600b illustrated in FIG. 4B, rectangular frames, representing the result of the image analysis processing (tracking processing), are overlapped on the image. Here, a solid-line rectangular frame represents successful tracking of the person P and a broken-line rectangular frame represents a failure to track the person P.

The high-frame rate image sequence 600a illustrated in FIG. 4A involves a small amount of movement of the person P from one frame to the subsequent frame, and thus the person P is successfully tracked in all the frames. On the other hand, the low-frame rate image sequence 600b illustrated in FIG. 4B involves a large amount of movement of the person P from one frame to the subsequent frame, and thus the person P is not successfully tracked. More specifically, the tracking of the person P has failed with the person P inaccurately tracked in the fourth frame 604 and with the person P being completely outside the tracking rectangular frame in the seventh frame 607. This is because the tracking processing generally includes determining a person, at a position in the image relatively close to a person who is a tracking target in the previous frame, to be a tracking candidate, resulting in the above-described failure to track the person as the tracking target with a relatively high moving speed as described above.

In the present exemplary embodiment, the analysis apparatus 400 determines that image analysis processing is executed with insufficient information, when the image analysis processing fails or is executed with a low accuracy. The analysis apparatus 400 requests the camera to transmit an image, in the images stored in the camera, corresponding to an interval where information for the image analysis processing is insufficient, and thus acquires the image corresponding to the interval.

In the case illustrated in FIG. 4B, the analysis apparatus 400 determines that information for the image analysis processing is insufficient in an interval between the first frame 601 and the fourth frame 604. Thus, as illustrated in FIG. 4C for example, the analysis apparatus 400 acquires the third frame 603, as one of the images corresponding to the interval between the first frame 601 and the fourth frame 604, from the camera. In the above-described case, the third frame 603 is acquired. Alternatively, the second frame 602 or both of the second frame 602 and the third frame 603 may be acquired.

As described above, the analysis apparatus 400 requests the transmission of the frame existing between the frames used in the image analysis processing, in the interval determined to have insufficient information for the image analysis processing. When the analysis apparatus 400 newly receives the frame 603 from the camera as illustrated in the image sequence 600c, the analysis apparatus 400 executes the image analysis processing again based on the plurality of frames in the image sequence 600b, which has already been received and based on the image corresponding to the newly received frame. As a result, the image analysis processing can be executed with a higher accuracy, and thus the person P can be appropriately tracked as illustrated in FIG. 4C.

Processing executed by the analysis apparatus 400 is described below with reference to FIG. 5. More specifically, the image analysis processing executed by the analysis apparatus 400 that has received an image transmitted by the camera 200A is described. The processing illustrated in FIG. 5 starts when a user instruction is input, for example.

Figure 5:
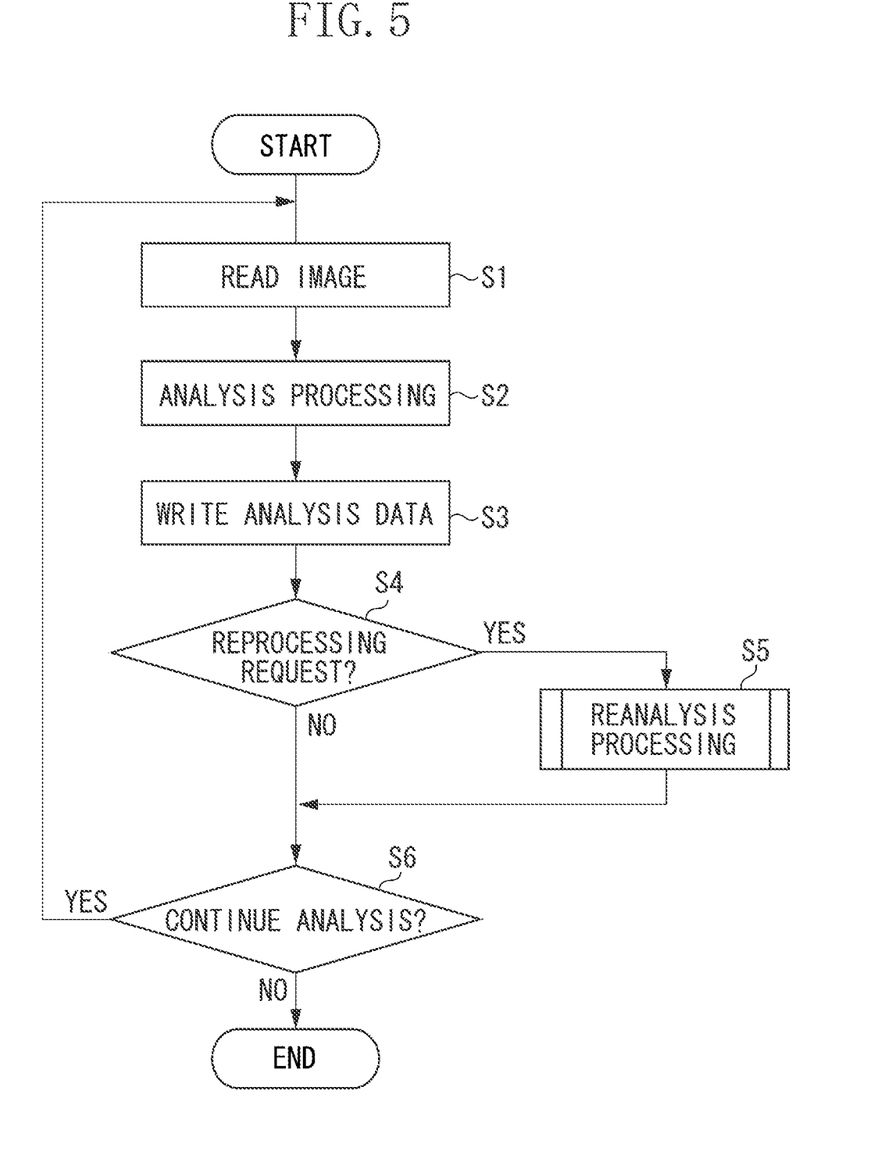
FIG. 5 is a flowchart illustrating processing executed by the analysis apparatus.

However, the starting timing of the processing illustrated in FIG. 5 is not limited to this. The processing illustrated in FIG. 5 may be executed by the analysis apparatus 400 when the CPU 41 reads and executes the required program.

As described above, the processing illustrated in FIG. 5 may be executed with at least part of the components illustrated in FIG. 2 operating as dedicated hardware. In such a case, the dedicated hardware operates based on control performed by the CPU 41. In the description below, alphabet S represents step in the flowchart.

First of all, in step S1, the server control unit 403 reads an image corresponding to one frame transmitted by the camera 200A, and outputs the image to the image analysis unit 401. In step S2, the image analysis unit 401 executes the image analysis processing based on the image thus acquired. For example, the image analysis unit 401 can execute the moving object detection processing and the moving object tracking processing as the image analysis processing.

For example, when the result of the image analysis processing indicates the failure to track the person (or low accuracy), the image analysis unit 401 turns ON a flag for executing reanalysis processing. For example, a determination that the tracking of a person has failed is made as follows. More specifically, the tracking processing is executed with an association between a tracking estimation result, representing an estimated position in the current frame based on an object position in a previous frame and a movement speed, and a result of detecting a moving object or a human body that is the target. Thus, the absence of the target moving object or human body as the detection result at the tracking estimated position can be determined to be the failure of the tracking processing. In this method described above, tracking of the moving object or the human body, which is the target, is determined to have failed when the target moving object or human body as the detection result and the tracking estimated position are not successfully associated with each other. The tracking processing may be executed with another method with a different feature for determining the tracking failure. Thus, in the present exemplary embodiment, the method of the tracking processing and how a processing failure is determined are not limited to particular manners. The reanalysis processing may be determined to be executed when a condition, set in advance or set by a user, is satisfied. For example, various conditions may be set, in accordance with the type of the image analysis processing, such as tracking interruption, face recognition failure, and face authentication failure.

Then, in step S3, the image analysis unit 401 writes the analysis data, which is the result of the image analysis processing, to the data storage unit 402. In step S4, the server control unit 403 determines whether an image analysis reprocessing request has been issued. More specifically, the server control unit 403 determines whether the flag for executing the reanalysis processing is ON in accordance with the result of the image analysis processing.

An additional data transmission request, as the reanalysis processing request, may be issued to the camera 200A at a timing when the result of analysis on the image corresponding to the frame 604 in the image sequence 600b is determined to be "tracking failure". In this configuration, the tracking can be performed with an improved real-time characteristic. The additional data transmission request, as the reanalysis processing request, may be issued to the camera 200A at a timing when the result of analysis on the image corresponding to the frame 607 in the image sequence 600b is determined to be "tracking failure". This is because even when the result of the analysis on the image corresponding to the frame 604 is "tracking failure", the analysis on the image thereafter may result in "successful tracking". Thus, the additional data transmission request may be issued to the camera 200A when the analysis results in "tracking failure" for a plurality of times. In this configuration, unnecessary image transmission can be prevented.

When the flag is ON and thus the reprocessing request is determined to have been issued (YES in step S4), the processing proceeds to step S5 in which the server control unit 403 executes the reanalysis processing described below. On the other hand, when the reprocessing request is determined to have not been issued (NO in step S4), the processing proceeds to step S6 in which the server control unit 403 determines whether to continue the image analysis processing. When the server control unit 403 determines to continue the image analysis processing in step S6 (YES in step S6), the processing returns to step S1. On the other hand, when the server control unit 403 determines to terminate the image analysis processing in step S6 (NO in step S6), the processing in FIG. 5 is terminated.

Figure 6:
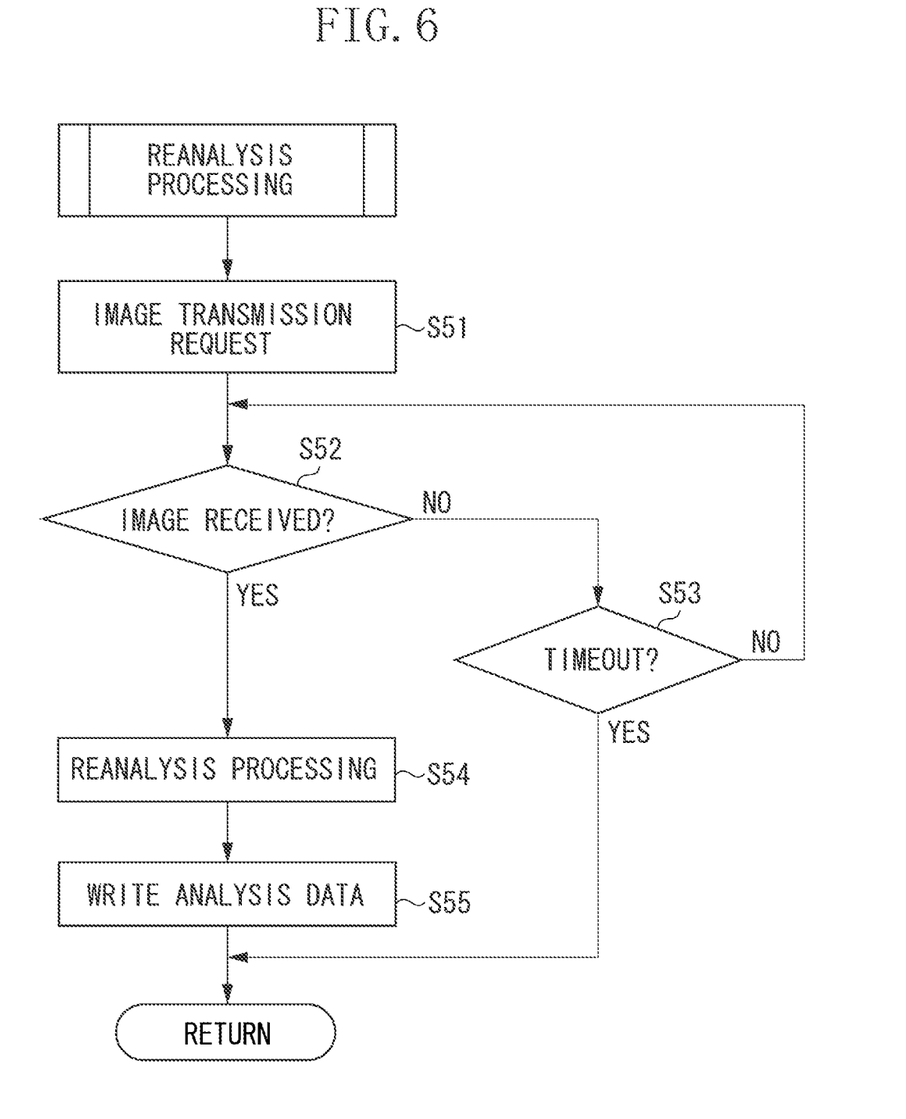
FIG. 6 is a flowchart illustrating a procedure of reanalysis processing.

FIG. 6 is a flowchart illustrating a procedure of the reanalysis processing executed in step S5 in FIG. 5. First of all, in step S51, the server control unit 403 requests the camera 200A to transmit the image corresponding to the interval where information for the image analysis processing is insufficient. In the case illustrated in FIG. 4B, the interval where information for the image analysis processing is insufficient is the interval between the first frame 601 and the fourth frame 604, and thus the server control unit 403 issues a request for transmitting the image corresponding to the interval. For example, the server control unit 403 can issue a request for transmitting an image frame by designating a frame number of an image frame existing in the interval where information for the image analysis processing is insufficient.

When the server control unit 403 issues the request for transmitting the image frame and the camera 200A receives the transmission request, the camera control unit 203 of the camera 200A reads the image corresponding to the frame number in the request from the recording unit 202, and transmits the image to the analysis apparatus 400. When the recording unit 202 includes no image corresponding to the frame number in the request, the camera control unit 203 may notify the analysis apparatus 400 of the absence of the image.

In step S52, the server control unit 403 determines whether the image has been received from the camera 200A to which the transmission request has been issued. When the image is determined to have not been received (NO in step S52), the processing proceeds to step S53 in which the server control unit 403 determines whether a predetermined waiting time has elapsed after the transmission request has been issued. When the server control unit 403 determines that the predetermined waiting time has not elapsed (NO in step S53), the waiting for the reception of the image continues. On the other hand, when the server control unit 403 determines that the predetermined waiting time has elapsed (YES in step S53), the processing is terminated due to timeout. The reanalysis processing may be terminated also when a notification indicating the absence of the image is received from the camera 200A.

In S52, when the server control unit 403 receives the requested image from the camera 200A (YES in step S52), the processing proceeds to step S54 in which the server control unit 403 outputs the newly received image to the image analysis unit 401 so that the image analysis unit 401 executes the image analysis processing again based on the input image and the image that has already been acquired. In step S55, the image analysis unit 401 writes the result of the reanalysis processing to the data storage unit 402, and the reanalysis processing is terminated.

As described above, the analysis apparatus 400 acquires images from the cameras 200A to 200C as the image capturing apparatuses, and executes the image analysis processing based on the acquired images. When the image analysis processing is executed with insufficient information, the analysis apparatus 400 acquires images used in addition to the image that has been used in the image analysis processing from the cameras 200A to 200C, and executes the reanalysis processing. When the image analysis processing is the moving object tracking processing of tracking an object in the image, the analysis apparatus 400 acquires images from the cameras 200A to 200C to achieve a higher frame rate, and executes the reanalysis processing.

As described above, the analysis apparatus 400 first executes the image analysis processing based on a low frame rate image. Then, when the result of the image analysis processing indicates a failure or insufficient accuracy, the analysis apparatus 400 requests the cameras 200A to 200C to transmit an additional image to achieve the image analysis processing with a higher accuracy. More specifically, the analysis apparatus 400 requests the image corresponding to the interval where information for the image analysis processing is insufficient to increase the number of frames. All things considered, highly accurate image analysis processing can be achieved in the system including a plurality of cameras connected to a network, without using a large amount of network bandwidth.

The moving object tracking processing using a low frame rate image has a risk of tracking interruption due to a subject moving largely in a short period of time or being temporarily hidden. The track, interrupted due to the tracking interruption, may be interpolated by calculation or estimation based on past tracking information, but this results in the increased calculation amount and the accuracy of the image analysis processing can be improved only to a limited level.

In view of this, in the present exemplary embodiment, when the image analysis processing is executed with insufficient information, the analysis apparatus 400 executes the reanalysis processing with the camera transmitting an image, in past images recorded and stored for a predetermined period of time, corresponding to the interval where information for the image analysis processing is insufficient. Thus, the highly accurate image analysis can be executed without increasing the calculation amount. When there is a missing image due to frame loss as a result of a communication error or the like, the analysis apparatus 400 may also determine that the image analysis processing is executed with insufficient information, and thus acquire an image and execute the reanalysis processing.

When the image analysis processing is executed with insufficient information, the analysis apparatus 400 acquires the image corresponding to the interval where information for the image analysis processing is insufficient from the cameras 200A to 200C, by designating the frame number or by performing the other like operation. Thus, the analysis apparatus 400 can easily and appropriately acquire the image, whereby the image analysis processing with a higher accuracy can be guaranteed.

In the case described in the exemplary embodiment described above, the analysis apparatus 400 executes the moving object detection processing and the moving object tracking processing as the image analysis processing, and acquires an image to achieve a high quality image data with a high frame rate, to achieve image analysis processing with a higher accuracy. However, the image analysis processing is not limited to the moving object detection processing and the moving object tracking processing, and the high quality image data for achieving the image analysis processing with a higher accuracy is not limited to that with a high frame rate.

The analysis apparatus 400 may execute the face recognition processing as the image analysis processing. In the face recognition processing, a lower image quality leads to a higher risk of failure. Thus, when the image analysis processing is the face recognition processing, the analysis apparatus 400 may request the camera for a high quality (high resolution) image, with a resolution (size) different from an image that has already been transmitted, as the additional image data for achieving the face recognition processing with a higher accuracy. In such a case, the camera may store therein the high quality (high resolution) image, and may transmit a low quality (low resolution) image for network transmission onto the network 500. Also in this case, effects that are the same as or similar to those obtained by the exemplary embodiment described can be obtained. The same applies to cases where the face detection processing or the face authentication processing is executed as the image analysis processing.

As described above, the image acquired when the image analysis processing is executed with insufficient information may be set as appropriate in accordance with the type of the image analysis processing. A high frame rate and high resolution image may be acquired depending on the type of the image analysis processing.

In the exemplary embodiment described above, the cameras 200A to 200C each include the recording unit 202 storing an image to be transmitted again to achieve image analysis processing with a higher accuracy. However, the recording unit 202 is not limited to the unit inside the camera.

Figure 7:
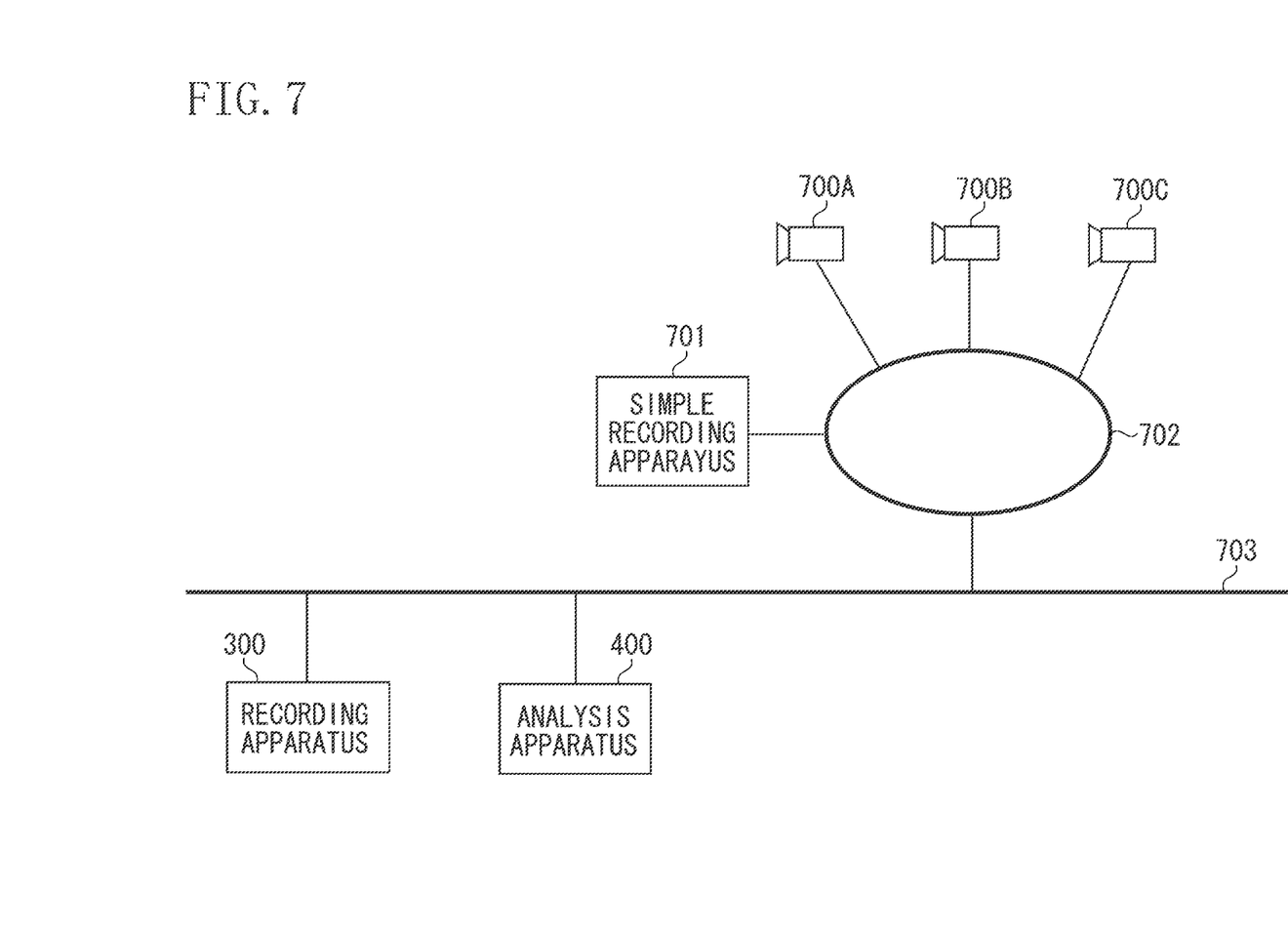
FIG. 7 is a network connection configuration diagram illustrating another example of the image processing system.

As illustrated in FIG. 7, the function of the recording unit 202 may be provided on the network. Cameras 700A to 700C include no recording unit, and transmit an image sequence captured with a predetermined frame rate to a network 702. A simple recording apparatus 701 stores an image from the camera in an internal image storage unit (not illustrated), and sends the stored image in response to a request from another apparatus. The network 702 establishes connection among the camera 700A to 700C and the simple recording apparatus 701, and further establishes data transmittable/receivable connection to a base network 703. The recording apparatus 300 and the analysis apparatus 400 are the same as those described in the above-described exemplary embodiment. The recording apparatus 300, the analysis apparatus 400, and the network 702 are connected to the base network 703.

In FIG. 7, the simple recording apparatus 701 stores an image, captured at a frame rate of 30 fps, transmitted from the camera 700A. The simple recording apparatus 701 stores an image from the camera 700A only herein, but can store images transmitted from the other cameras 700B and 700C at the same time. A simple recording apparatus may be further provided on the network 702 to store an image from the camera 700B or the camera 700C.

As described above, the camera 700A transmits the 30-fps image to the simple recording apparatus 701, and transmits a 10-fps image to the base network 703 at the same time. The recording apparatus 300 stores the 10-fps image transmitted from the camera 700A in an internal hard disk and the like. The image may be transmitted to the base network 703 not from the camera 700A but may be transmitted from the simple recording apparatus 701 after performing the frame rate conversion on the image.

The analysis apparatus 400 executes the image analysis processing by acquiring an image from the recording apparatus 300 and requests an image for the reanalysis processing in a manner that is the same as that in the exemplary embodiment described above. In this configuration, the analysis apparatus 400 requests the simple recording apparatus 701 to transmit the image for the reanalysis processing. As described above, effects that are the same as or similar to those in the exemplary embodiment can be obtained also with the configuration illustrated in FIG. 7.

The present invention can be implemented through processing including supplying a program for implementing at least one function of the exemplary embodiments described above to a system or an apparatus via a network or a storage medium, and reading and executing the program with at least one processor in a computer in the system or the apparatus. Furthermore, the present invention may be implemented with a circuit (an application specific integrated circuit (ASIC)) that implements at least one function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-106236, filed May 27, 2016, which is hereby incorporated by reference herein in its entirety.

What is claimed is:

1. An image processing apparatus comprising:
   an acquisition unit configured to acquire image data of an image captured by an image capturing apparatus, via a network; and
   an analysis unit configured to execute analysis processing based on the image data acquired by the acquisition unit,
   wherein the acquisition unit is configured to acquire, via the network, as additional image data, image data of an image captured by the image capturing apparatus that is different from the image data having been used for the analysis processing, depending on a result of the analysis processing executed by the analysis unit, and
   wherein the analysis unit is configured to execute reanalysis processing by using the additional image data.

2. The image processing apparatus according to claim 1, wherein the analysis processing is analysis processing of tracking an object in an image, and
   wherein the analysis unit is configured to execute, by using the additional image data, the reanalysis processing on image data with a higher frame rate compared with the analysis processing before the additional image data is added.

3. The image processing apparatus according to claim 1, wherein the analysis processing includes at least one of face detection processing, face recognition processing, and face authentication processing with respect to a face in an image, and
   wherein the analysis unit is configured to execute, by using the additional image data, the reanalysis processing on image data with a higher resolution compared with the analysis processing before the additional image data is added.

4. The image processing apparatus according to claim 1, wherein the acquisition unit is configured to acquire, as the additional image data, an image to improve an accuracy of the analysis processing in an interval where image data for the analysis processing is insufficient.

5. The image processing apparatus according to claim 1, wherein the analysis processing is at least one of moving object detection processing, moving object tracking processing, human body detection processing, face detection processing, face recognition processing, face authentication processing, passage detection processing, intrusion detection processing, and congestion detection processing.

6. The image processing apparatus according to claim 1, wherein the analysis unit is configured to issue a request for acquiring the additional image data when the analysis processing fails for a predetermined number of times.

7. An image transmission apparatus comprising:
   a storage unit configured to store an image captured by an image capturing unit; and
   a transmission unit configured to transmit image data of the image captured by the image capturing unit to an image processing apparatus via a network,
   wherein the transmission unit is configured to transmit, to the image processing apparatus via the network, as additional image data to be used for reanalysis processing, image data of an image that is different from the image data having been used for the analysis processing and is stored in the storage unit, depending on a result of analysis processing executed by the image processing apparatus on the image data.

8. An image processing method comprising:
   acquiring, as a first acquisition, image data of an image captured by an image capturing apparatus, via a network;
   executing analysis processing based on the acquired image data;
   acquiring, as a second acquisition, via the network, as additional image data, image data of an image captured by the image capturing apparatus that is different from the image data having been used for the analysis processing, depending on a result of the analysis processing executed by the analysis unit; and
   executing reanalysis processing by using the additional image data.

9. The image processing method according to claim 8, wherein the analysis processing is analysis processing of tracking an object in an image, and
   wherein, in the executing of the reanalysis processing, by use of the additional image data, the reanalysis processing is executed on image data with a higher frame rate compared with the analysis processing before the additional image data is added.

10. The image processing method according to claim 8, wherein the analysis processing includes at least one of face detection processing, face recognition processing, and face authentication processing with respect to a face in an image, and
    wherein, in the executing of the reanalysis processing, by use of the additional image data, the reanalysis processing is executed on image data with a higher resolution compared with the analysis processing before the additional image data is added.

11. The image processing method according to claim 8, wherein, in the acquiring of the additional image data, as the additional image data, an image is acquired to improve an accuracy of the analysis processing in an interval where image data for the analysis processing is insufficient.

12. The image processing method according to claim 8, wherein the analysis processing is at least one of moving object detection processing, moving object tracking processing, human body detection processing, face detection processing, face recognition processing, face authentication processing, passage detection processing, intrusion detection processing, and congestion detection processing.

13. The image processing method according to claim 8, wherein, in the acquiring of the additional image data, a request for acquiring the additional image data is issued when the analysis processing fails for a predetermined number of times.

14. A non-transitory computer readable medium storing a program for causing a computer to execute an image processing method, the method comprising:
  acquiring, as a first acquisition, image data of an image captured by an image capturing apparatus, via a network;
  executing analysis processing based on the acquired image data;
  acquiring, as a second acquisition, via the network, as additional image data, image data of an image captured by the image capturing apparatus that is different from the image data having been used for the analysis processing, depending on a result of the analysis processing executed by the analysis unit; and
  executing reanalysis processing by using the additional image data.

* * * * *